B. E. Lehman,
Stop Cock,
Nº 58,845. Patented Oct. 16, 1866.
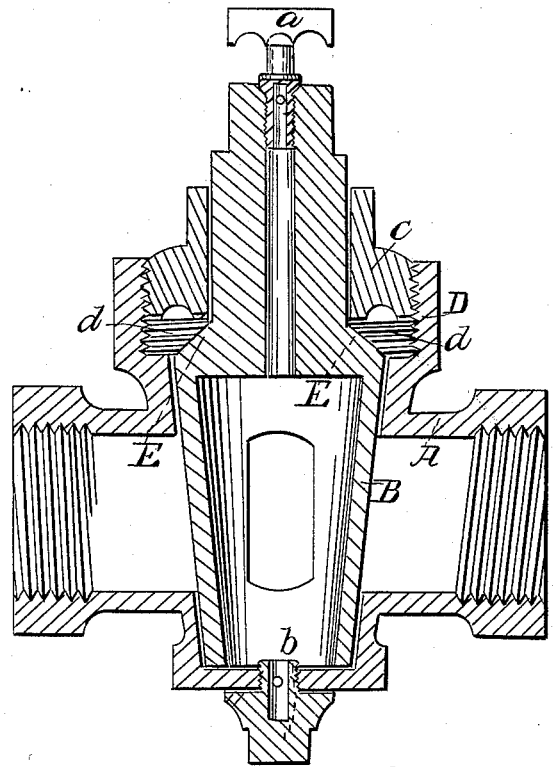
Witnesses:
Jas. A. Service.
Inventor:
B. E. Lehman

UNITED STATES PATENT OFFICE.

B. E. LEHMAN, OF BETHLEHEM, PENNSYLVANIA.

IMPROVEMENT IN STOP-COCKS.

Specification forming part of Letters Patent No. 58,845, dated October 16, 1866.

*To all whom it may concern:*

Be it known that I, B. E. LEHMAN, of Bethlehem, Northampton county, State of Pennsylvania, have invented a new and Improved Stop-Cock; and I do hereby declare that the following is a full, clear, and exact description thereof, which will enable others skilled in the art to make and use the same, reference being had to the accompanying drawing, forming part of this specification.

The drawing represents a longitudinal section of this invention.

This invention relates to a stop-cock the plug of which is open at the bottom, and fitted into a case which is closed at the bottom and provided with a stuffing-box on top, so as to hold the plug down in its seat and prevent the escape of steam or liquid. The liquid or condensed water accumulating in the case and plug is drawn off through suitable waste-valves—one in the bottom of the case and the other in the top end of the plug—in such a manner that in cold weather the stop-cock sustains no damage by the freezing of said water or other liquid.

A represents the shell or case of my stop-cock, which is provided with a conical seat to receive the plug B. This plug is open at the bottom, and the case is closed opposite to the thin end of the plug, said plug being retained in its seat by a nut, C, which fits over its shank and screws in a stuffing-box, D, on the shell or case, as clearly shown in the drawing. The plug B has a beveled edge, E, by reason of which the joint between the plug and the case A can be rendered more secure, as regards the escape of the liquid through said joint when the nut is screwed upon the packing, than if a square joint were employed.

Suitable packing, *d*, is placed into the stuffing-box and compressed by the nut C, and by this packing the plug is prevented from leaving its seat spontaneously or by accident, and the escape of steam or liquid is prevented.

The water resulting from the condensation of steam or other liquid remaining in the plug when the same is closed can be let off by waste-valves *a b*, one of which is inserted in the bottom of the case A and the other in the top of the plug B. These waste-valves are either simple screws provided with a central cavity and with lateral escape-openings, so that by partially unscrewing said screws the liquid contained in the plug is free to escape, or, instead of such screws, any other suitable valve may be used which can be conveniently opened and closed, and which will serve the desired purpose. By the application of these waste-valves the plug is prevented from being injured in cold weather, when the liquid allowed to accumulate in the same is liable to freeze and to burst the shell. By the use of the waste-valves all danger of this kind can be avoided with very little attention.

What I claim as new, and desire to secure by Letters Patent, is—

1. The plug made open at its lower end, with a transverse water-passage, as and for the purpose set forth.

2. The stuffing-box D, in combination with the case A and plug B, open at its lower end, and provided with the beveled edge E, substantially as described.

3. The waste-valves *a b*, in combination with the plug B, constructed and operating substantially as and for the purpose set forth.

The above specification of my invention signed by me this 23d day of April, 1866.

B. E. LEHMAN.

Witnesses:
WM. F. MCNAMARA,
W. HAUFF.